United States Patent
Niino et al.

[11] Patent Number: 5,833,522
[45] Date of Patent: Nov. 10, 1998

[54] MACHINING SPINDLE APPARATUS HAVING A HYDROSTATIC BEARING FOR MACHINE TOOLS

[75] Inventors: Yasuo Niino, Aichi-ken; Toshihiko Shima, Okazaki, both of Japan

[73] Assignee: Toyoda Koki Kabushiki Kaisha, Kariya, Japan

[21] Appl. No.: 755,557

[22] Filed: Nov. 22, 1996

[30] Foreign Application Priority Data

Nov. 24, 1995 [JP] Japan ................................ 7-327867

[51] Int. Cl.⁶ ........................... B24B 5/00; B24B 41/04
[52] U.S. Cl. ...................... 451/294; 451/342; 451/363
[58] Field of Search .................................. 384/134, 474, 384/475, 477, 607; 451/177, 178, 259, 294, 342, 360, 363

[56] References Cited

U.S. PATENT DOCUMENTS

| | | |
|---|---|---|
| 2,343,875 | 3/1944 | Schwartz . |
| 2,504,899 | 4/1950 | Sterret . |
| 3,570,191 | 3/1971 | Williams ................................ 451/294 |
| 3,650,582 | 3/1972 | Casey . |
| 3,698,725 | 10/1972 | Klabunde . |
| 3,805,919 | 4/1974 | Nakamura et al. . |
| 4,339,160 | 7/1982 | McHugh . |
| 4,811,525 | 3/1989 | Kimura et al. . |
| 5,027,280 | 6/1991 | Ando et al. ......................... 451/294 X |
| 5,443,413 | 8/1995 | Pflager et al. . |
| 5,462,470 | 10/1995 | Oda et al. .............................. 451/294 |
| 5,496,207 | 3/1996 | Hornung et al. .................... 451/294 X |

FOREIGN PATENT DOCUMENTS

| | | |
|---|---|---|
| 61-25921 | 8/1986 | Japan . |
| 62-148102 | 7/1987 | Japan . |

*Primary Examiner*—Timothy V. Eley
*Attorney, Agent, or Firm*—Oblon, Spivak, McClelland, Maier & Neustadt, P.C.

[57] ABSTRACT

A machining spindle apparatus has a hydrostatic bearing for machine tools. The machining spindle apparatus includes a built-in motor built into the middle of a housing, as well as front and rear hydrostatic bearings respectively mounted on the front side and the rear side of the housing. A machining spindle is driven by the built-in motor and rotatably supported by the front and rear hydrostatic bearings. The front hydrostatic bearing comprises a radial bearing pocket and a thrust bearing pocket. In addition, a pair of pneumatic seals lie over the radial and thrust bearing pockets. The rear hydrostatic bearing includes a radial bearing pocket and a constant-pressurized oil chamber. The constant-pressurized oil chamber operates as a piston cylinder. Accordingly, a predetermined pressure acts forward, i.e. opposite the thrust bearing pocket of the front hydrostatic bearing. And another pair of pneumatic seals lies over both of the radial bearing pocket and the constant-pressurized oil chamber.

10 Claims, 2 Drawing Sheets

MACHINING SPINDLE APPARATUS HAVING A HYDROSTATIC BEARING FOR MACHINE TOOLS

BACKGROUND OF THE INVENTION

1. Field of the Invention

The present invention relates to a machining spindle apparatus having a hydrostatic bearing for machine tools. More particularly, it relates to a wheel spindle unit having a hydrostatic bearing for a grinding machine.

2. Discussion of Related Art

In a wheel spindle unit for a grinding machine, it is known there exist two systems of driving the wheel spindle, i.e. a belt driven type and a direct driven type. Briefly, the former, as shown in the Japanese un-examined patent publication (kokai) 61-25921 for example, provides a belt-driven transmission in which a drive shaft of an electric motor and the wheel spindle connect to each other through a belt and pulleys. Furthermore, note is taken that one of the pulleys is attached to the back portion of the wheel spindle opposite to a grinding wheel. The latter, as shown in the Japanese un-examined patent publication (kokai) 62-148102 for example, provides a direct-driven transmission, whereas the drive shaft of the electric motor is directly joined to the end of the wheel spindle. Hence the electric motor projects out over the opposite position to the grinding wheel.

In the former, it is necessary to resist a belt tension at the rear of the wheel spindle or a rear bearing. In the latter, it is also necessary to resist the load of the electric motor itself at the rear of the wheel spindle or the rear bearing, because the electric motor is so mounted that it overhangs to the rear. In both aforementioned systems, each rear bearing therefore needs an excess area (hereinafter referred to as a "bearing area") for resisting the tension or load. Thus the bearing area is considerably made larger, compared to that of a front bearing.

In case hydrostatic bearings are utilized in the wheel spindle unit, a fluid shearing force arises proportional to the bearing area. In addition, when a rotational speed of the wheel spindle is increased, power consumption increases in proportion to the amount of the squared rotational speed due to the fluid shearing force of the hydrostatic bearing. Accordingly, the power consumption of the hydrostatic bearing cannot be reduced as long as the bearing area is not decreased.

Besides, in the above-described conventional systems, a constant-pressurized oil chamber was disposed on a flange which was provided on the wheel spindle, thereby operating as a thrust hydrostatic bearing. However the thrust hydrostatic bearing needs to be enlarged radially, considering that the constant-pressurized oil chamber must be arranged on or around the flange of the wheel spindle. As a result, an increasing in radial dimension increases the power consumption extremely under the influence of the fluid shearing force.

SUMMARY OF THE INVENTION

In view of the foregoing, an object of the present invention is to provide an improved machining spindle apparatus capable to minimizing a power consumption of a hydrostatic bearing by arranging a built-in motor into the machining spindle apparatus.

Another object of the present invention is to provide a pneumatic seal for the hydrostatic bearing in order to prevent a leak of lubricating oil. And consequently, it is unnecessary to pay attention to the design of a collection pan (or sump) for the lubricating oil in the machining spindle apparatus. The reason is that the pneumatic seal functions to collect the lubricating oil using compressed air.

In the present invention, the machining spindle apparatus for machine tools comprises a housing having a cylindrical hollow, a built-in motor installed into the middle of the cylindrical hollow, front and rear hydrostatic bearings respectively mounted on the front side and the rear side of the housing, and a machining spindle driven by the built-in motor and rotatably supported by the front and rear hydrostatic bearings. Besides, a flange is provided on the machining spindle.

The front hydrostatic bearing comprises a front metal bearing, in which a radial bearing pocket is disposed opposite an outer cylindrical surface of the machining spindle and similarly a thrust bearing pocket is disposed opposite a side of the flange. In addition, a pair of pneumatic seals lies over the radial and thrust bearing pockets.

The rear hydrostatic bearing also comprises a rear metal bearing, in which a radial bearing pocket is disposed opposite the outer cylindrical surface of the machining spindle and similarly a constant-pressurized oil chamber is disposed at the rear of the machining spindle. Thus, thrust load is resisted at the forward and backward positions of the housing. Another pair of pneumatic seals lies over both the radial bearing pocket and the constant-pressurized oil chamber.

In the above-described front hydrostatic bearing, the lubricating oil is delivered to both the front radial pocket and the front thrust pocket. Similarly, in the rear hydrostatic bearing, the lubricating oil is delivered to both the rear radial pocket and the constant-pressurized oil chamber. Subsequently the lubricating oil is collected through collecting passages for the lubricating oil.

Each pair of pneumatic seals is disposed on the front and rear hydrostatic bearings respectively, and operates with a sealing function. In addition to this sealing function, the compressed air of the pneumatic seal serves to collect the lubricating oil since the compressed air is delivered to the drain passages to promote the drain of the lubricating oil. Thus, the compressed air assists in delivering the lubricating oil to a reservoir and prevents the lubricating oil from leaking outside. Furthermore, the pneumatic seal prevents chips, dust, or the like from intruding into the front hydrostatic bearing.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 1 is a sectional view illustrating the overall structure of a wheel spindle unit for a grinding machine, and shows passages for a lubricating oil; and FIG. 2 is another sectional view illustrating the overall structure of the wheel spindle unit for the grinding machine, and is depicted in a different angular phase as compared to FIG. 1 in order to show passages for compressed air.

DETAILED DESCRIPTION OF THE PREFERRED EMBODIMENT

An embodiment of the present invention will now be described with reference to the drawings.

Figure 1:
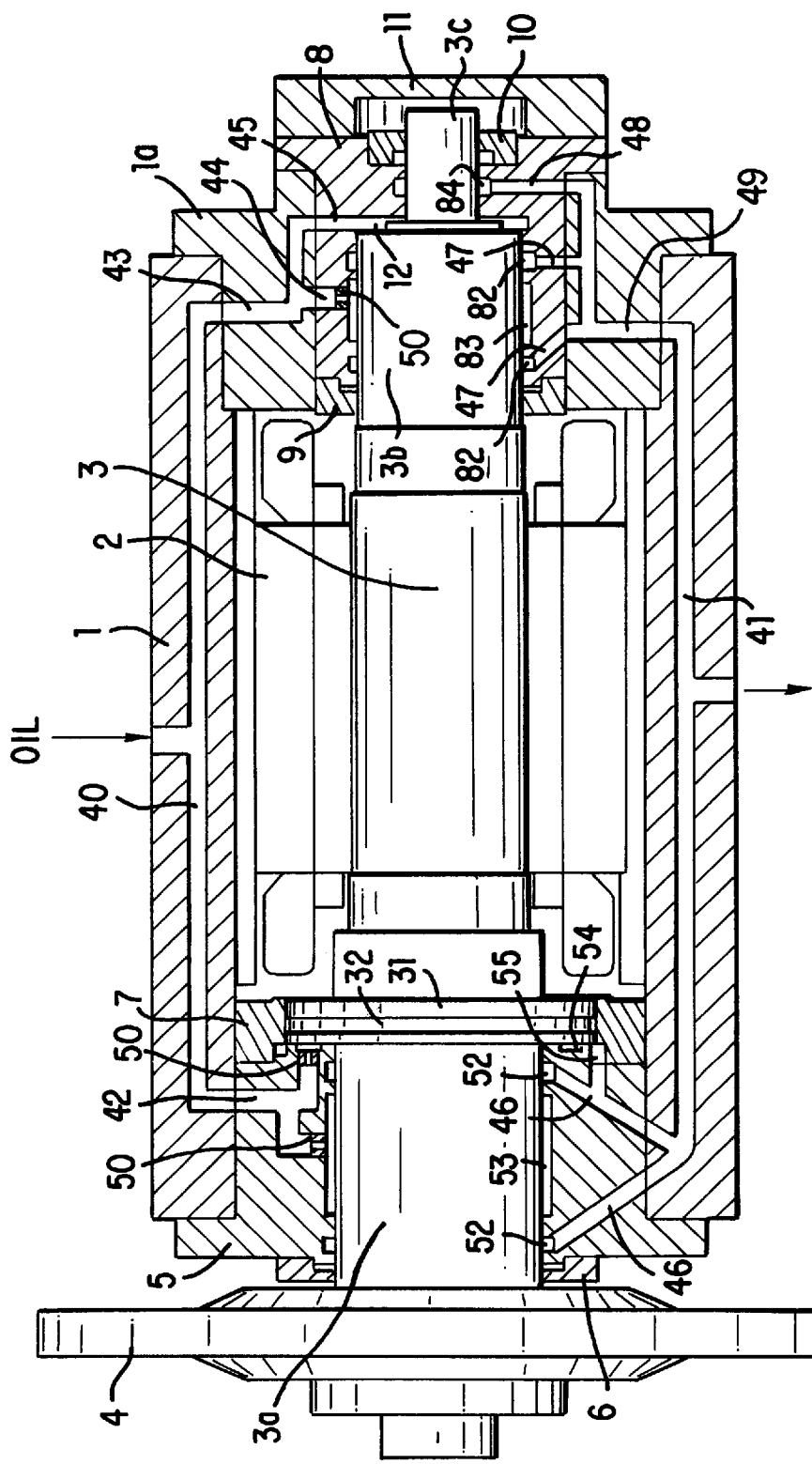
Figure 2:
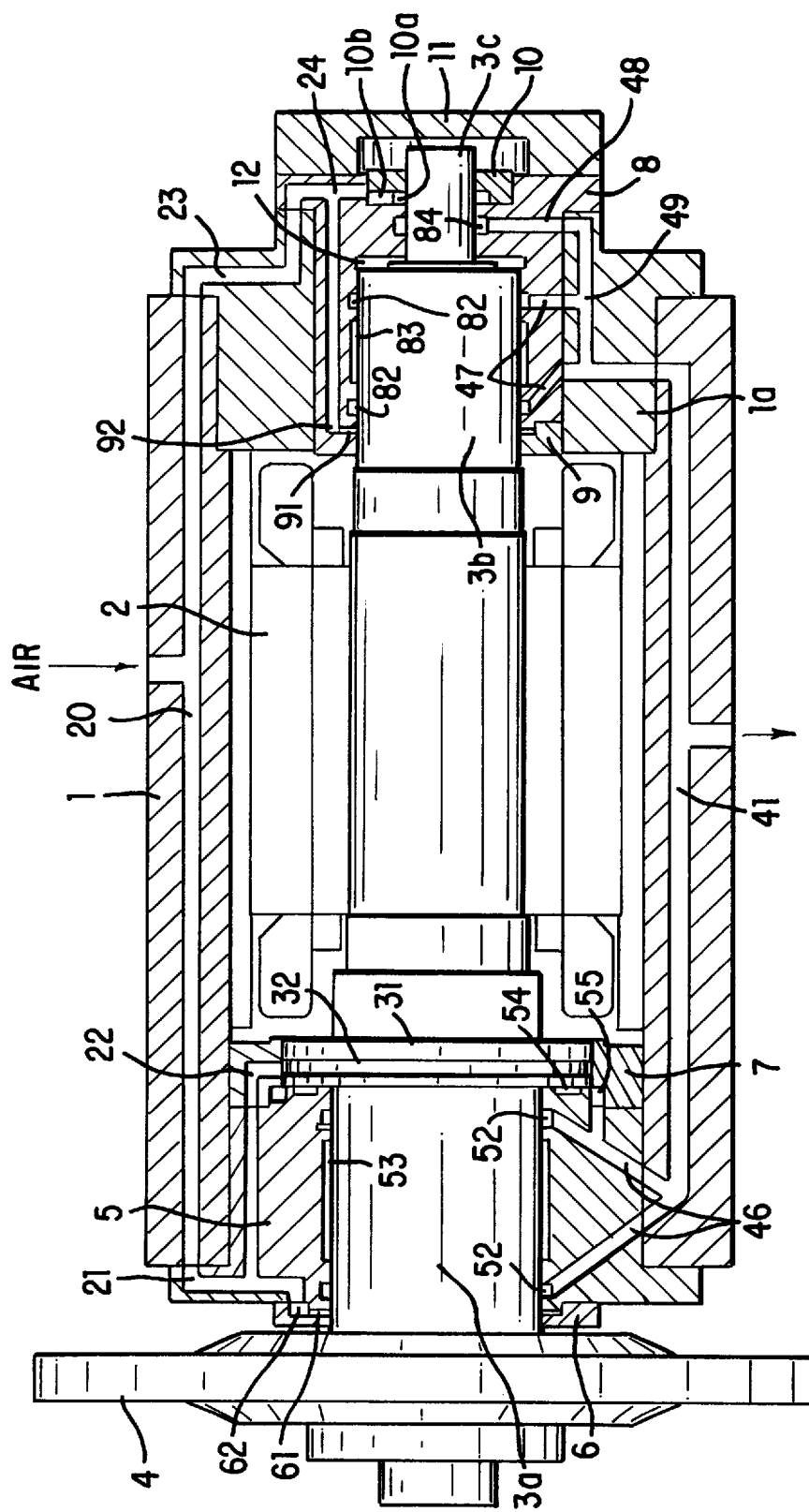

Referring now to FIGS. 1 and 2, a wheel spindle unit for a grinding machine comprises a main housing 1 having a cylindrical hollow, a built-in motor 2 installed into the middle of the cylindrical hollow, a front hydrostatic bearing mounted on the front side of the main housing 1, a rear hydrostatic bearing mounted on the rear side thereof, and a wheel spindle 3 (i.e. a machining spindle) mounting a grinding wheel 4 and rotatably supported by each of the front and rear hydrostatic bearings. The wheel spindle 3 serves as a drive shaft of the built-in motor 2. In present embodiment, the wheel spindle 3 will be described by respectively dividing it into a front spindle segment 3a, a rear spindle segment 3b, and a projected spindle segment 3c for the sake of convenience. A flange 31 having an annular groove 32 on its outer cylindrical surface, is provided on the front spindle segment 3a.

The front hydrostatic bearing will be now described which supports the front spindle segment 3a.

Mounted to a front opening of the main housing 1 is a front metal bearing 5 with a flange. On the front of the front metal bearing 5, a front lid 6 is precisely mounted to keep a strict tolerance between the front spindle segment 3a and the front lid 6, and thereby a cavity 61 is formed between the front lid 6 and the front metal bearing 5. Disposed on the front lid 6 is a communication groove 62 which fluidly communicates with the cavity 61 and the front metal bearing 5 as shown in FIG. 2. Furthermore mounted behind the front metal bearing 5 is an annular intermediate ring 7 of which the inner diameter is larger than that of the front metal bearing 5. Thereby, a concave portion is formed in order to install the flange 31.

As to the front metal bearing 5, a pair of annular grooves 52, 52 are disposed on its inner cylindrical surface and at both ends thereof, and a plurality of front radial bearing pockets 53 are disposed in between the annular grooves 52, 52. Besides, a plurality of annular thrust bearing pockets 54 are disposed opposite the flange 31 and on a land portion formed on the rear end of the front metal bearing 5. By putting the annular intermediate ring 7 on the front metal bearing 5, an annular channel 55 is formed there between.

The annular grooves 52, 52 are arranged so as to be adjacent to the cavity 61 and the flange 31, and the annular channel 55 is arranged so as to be adjacent to the annular groove 32.

The rear hydrostatic bearing will be now described which supports the rear spindle segment 3b.

A rear housing 1a with a flange is mounted to a rear opening of the main housing 1. Subsequently installed into the rear housing 1a is a rear metal bearing 8 of which inner diameter is substantially smaller than that of the front metal bearing 5. In front of the rear bearing metal 8, an intermediate ring 9 is mounted precisely to keep a strict tolerance between the rear spindle segment 3b and the intermediate ring 9, thereby forming a cavity 91 between the intermediate ring 9 and the rear metal bearing 8. Furthermore a communication groove 92 is so disposed on the intermediate ring 9 that it fluidly communicates with the cavity 91 and the rear metal bearing 8, as shown in FIG. 2.

As to the rear metal bearing 8 which forms a rear concave portion, a rear lid 10 is precisely mounted onto the concave portion to keep a strict tolerance between the projected spindle segment 3c and the rear lid 10. The rear lid 10 disposes a cavity 10a inside, and furthermore a communication bore 10b radially to fluidly communicate with the cavity 10a and the rear metal bearing 8. Inside the rear metal bearing 8 two inner diameters are formed as an inner step, and the smaller one is equal to the inner diameter of the rear lid 10. A rear end cover 11 is so mounted that it surrounds the rear metal bearing 8, the rear lid 10, and the rear of the projected spindle segment 3c.

Furthermore as to the rear metal bearing 8, a pair of annular grooves 82, 82 are disposed on its inner cylindrical surface and at both ends thereof. And a plurality of rear radial bearing pockets 83 are disposed in between the annular grooves 82, 82. Besides, an annular groove 84 is disposed on the inner cylindrical surface of a bore for spindle segment 3c. By adjustably inserting the rear spindle segment 3b into the rear metal bearing 8 with a predetermined clearance, a constant-pressurized oil chamber 12 is formed there between. As a result a stepped portion between the rear spindle segment 3b and the projected spindle segment 3c precisely faces to the inner portion of the rear metal bearing 8, and the combination of the constant-pressurized oil chamber 12 and the projected spindle segments 3c operates as a piston and cylinder. Namely, a predetermined pressure in the oil chamber 12 acts to press the spindle 3 toward pressure acts toward the front metal bearing 5.

A lubricating oil circuit of the wheel spindle unit will be now described in detail with reference to FIG. 1.

An inlet port is disposed in the upper side of the main housing 1, while a drain port is disposed in the lower side of the main housing 1. The lubricating oil supplied through the inlet port is delivered to an oil supply passage 40 which is divided forward and backward, and subsequently is delivered to the front hydrostatic metal bearing 5 and the rear hydrostatic metal bearing 8. The lubricating oil drained from the front hydrostatic bearing metal 5 and the rear hydrostatic metal bearing 8, is delivered to a drain passage 41, and is collected to an unillustrated reservoir through the drain port.

As to the front metal bearing 5, an oil supply passage 42 is so provided as to fluidly communicate with the front bearing pockets 53 and the thrust bearing pockets 54. Besides, each of the bearing pockets 53 and 54 has a throttle element 50 provided at outlets of the oil supply passage 42 respectively.

As to the rear housing 1a, an oil supply passage 43 is so provided as to divide it into two passages which fluidly communicate to the radial bearing pockets 83 and the constant-pressurized oil chamber 12 respectively.

As to the rear metal bearing 8, oil supply passages 44 are so provided that they fluidly communicate with the oil supply passage 43 and the rear radial bearing pockets 83, and similarly, an oil supply passage 45 is so provided that it fluidly communicates with the constant-pressurized oil chamber 12. Besides, each of the rear radial bearing pockets 83 has a throttle element 50 which is provided at an outlet of the oil supply passages 44.

In the lower side of the front metal bearing 5, at least of drain passage 46 are so provided that they fluidly communicates with the pair of annular grooves 52, 52 and the drain passage 41, and the other thereof fluidly communicates with the annular channel 55. In the lower side of the rear metal bearing 8, drain passages 47 are so provided that they fluidly communicate with the pair of the annular grooves 82, 82 and a drain passage 49, and furthermore, a drain passage 48 is so provided that it fluidly communicates with the drain passage 49 and the annular groove 84. In the lower side of the rear housing 1a, the drain passage 49 is so provided that it fluidly communicates with the drain passages 41, 47, and 48.

The drain passage 41 fluidly communicates with the drain port, and subsequently the lubricating oil is collected to the unillustrated reservoir. In contrast to the present embodiment, the drain passages may be provided at the upper side of the main housing 1. The reason is that the compressed air is capable of delivering the lubricating oil by utilizing the drain passages, and assists in delivering the lubricating oil to a reservoir.

A compressed air circuit for the pneumatic seal in the wheel spindle unit will be now described in detail with reference to FIG. 2. Furthermore, the compressed air circuit is disposed independent of the aforementioned lubricating oil circuit shown in FIG. 1. Namely in the present embodiment, the interference with the arrangements between the lubricating oil circuit and the compressed air circuit is avoided by mounting them with different angular phase.

An inlet port is disposed in the upper side of the main housing 1, while a drain port is disposed in the lower side thereof. The compressed air supplied through the inlet port is delivered to an air supply passage 20 which divides it forward and backward, and subsequently is delivered to the front hydrostatic metal bearing 5 and the rear hydrostatic metal bearing 8.

As to the front metal bearing 5, an air supply passage 21 is so provided as to divide it into two passages which fluidly communicate to the cavity 61 and the annular groove 32 respectively.

As to the annular intermediate ring 7, an air supply passage 22 is so provided that it fluidly communicates with the air supply passage 21 and the annular groove 32.

As to the rear housing 1a, an air supply passage 23 is so provided that it fluidly communicates with the air supply passage 20 and the inside of the rear metal bearing 8.

As to the rear metal bearing 8, an air supply passage 24 is so provided that it fluidly communicates to the front end and the rear end of the rear metal bearing 8 from the air supply passage 23. The compressed air supplied from the air supply passage 24 is delivered to the cavity 91 through the communication groove 92. Similarly, the compressed air supplied from the air supply passage 24 is delivered to the cavity 10a through the communication bore 10b.

Next, an operation of the present embodiment will be now described in detail.

In FIG. 1, when the lubricating oil from the unillustrated oil supply pump is delivered into the oil supply passage 40, the lubricating oil is supplied to both of the front radial bearing pockets 53 and the thrust bearing pockets 54 through the throttle elements 50. And similarly, when the lubricating oil from the unillustrated oil supply pump is delivered to the oil supply passages 44 and 45 through the oil supply passages 43, the lubricating oil is supplied to the constant-pressurized oil chamber 12 as well as the rear radial bearing pockets 83 through the throttle elements 50.

The radial loads of the wheel spindle 3 are supported at both ends of the wheel spindle unit, namely by the front radial bearing pockets 53 and the rear radial bearing pockets 83 in each hydrostatic bearing. Similarly, the thrust loads of the wheel spindle 3 are supported at both ends of the wheel spindle unit, namely by the thrust bearing pockets 54 and the constant-pressurized oil chamber 12 which are opposite each other.

In FIG. 1, the lubricating oil supplied to the front radial bearing pockets 53, is throttled at each land of the pocket, and subsequently is drained to the drain passages 46 through the annular grooves 52, 52. Similarly, the lubricating oil supplied to the thrust bearing pockets 54, is throttled at each land and subsequently is drained to the drain passages 46 through the annular channel 55.

The lubricating oil supplied to the rear radial bearing pockets 83, is throttled at each land portion and subsequently is drained to the drain passages 47 through the annular grooves 82. Similarly, the lubricating oil supplied to the constant-pressurized oil chamber 12, is throttled at each land portion and subsequently is drained to the drain passage 48 through the annular grooves 84.

All drained lubricating oil is collected and delivered to the unillustrated reservoir.

In FIG. 2, an unillustrated air supply pump for the pneumatic seal is provided separate from the oil supply pump for the hydrostatic bearings. When the compressed air supplied from the air supply passage 20 is delivered to the cavity 61 through the air supply passage 21 and the communication groove 62, the compressed air penetrates along the outer cylindrical surface of the front spindle segment 3a into the annular groove 52. Similarly when the compressed air supplied from the air supply passage 20 is delivered to the annular groove 32 of the flange 31 through the air supply passages 21 and 22, the compressed air penetrates along the outer cylindrical surface of the flange 32 into the annular channel 55. As a result, the pneumatic seal operates with a sealing function to prevent the lubricating oil from leaking outside of both ends of the front hydrostatic metal bearing 5. In addition to this sealing function, a pressure of the compressed air of the pneumatic seal serves for the collection of the lubricating oil since the compressed air is delivered. Thus, the compressed air forms pneumatic seals which are outside of each of the respective radial bearing pockets and assists in delivering the lubricating oil to a reservoir and prevents the lubricating oil from leaking outside. Furthermore, the pneumatic seal prevents chips, dust, or the like from intruding into the front hydrostatic bearing.

An effect of the present embodiment will be now described.

The built-in motor is arranged into the middle of the housing and is rotatably supported in between the front hydrostatic bearing and the rear hydrostatic bearing. Thus, the loads acting at the rear hydrostatic bearing are diminished, compared with the conventional driving system exposed to the belt tension, and a more compact the rear hydrostatic bearing results. Furthermore, as a result of the structure of the rear hydrostatic bearing being reduced, it is possible to reduce the leak amount of the lubricating oil. Accordingly, the sealing effect is enhanced and the power consumption is reduced.

The pneumatic seals provided on each of the front and rear hydrostatic bearings, allow shortening the length of the bearing portion, because the pneumatic seals are simple compared to a typical labyrinth seal. Accordingly, the front hydrostatic bearing is made compact.

Obviously, numerous modifications and variations of the present invention are possible in light of the above teachings. It is therefore to be understood that within the scope of the appended claims, the present invention may be practiced otherwise than as specifically described herein.

What is claimed is:

1. A machining spindle apparatus having a built-in motor built into a substantially middle part of a housing, comprising:

a machining spindle directly driven by the built-in motor;
a first hydrostatic bearing means fixedly mounted on the housing and rotatably supporting one end of the machining spindle, said first hydrostatic bearing means having a first radial bearing pocket for supporting radial loads;

a second hydrostatic bearing means fixedly mounted on the housing and rotatably supporting the other end of the machining spindle, and said second hydrostatic bearing means having a second radial bearing pocket; and a pneumatic seal means for sealing said first and second hydrostatic bearing means, said pneumatic seal means being formed outside of each of the respective radial bearing pockets.

2. A machining spindle apparatus according to claim 1, wherein:

said first hydrostatic bearing means has a first thrust bearing pocket disposed on a cylindrical surface of the spindle, and said second hydrostatic bearing means has a constant pressurized fluid chamber disposed on the opposite end of the machining spindle to said first thrust bearing pocket.

3. A machining spindle apparatus according to claim 2, wherein said pneumatic seal means is formed outside of both said first radial bearing pocket and said first thrust bearing pocket.

4. A machining spindle apparatus according to claim 3, wherein said pneumatic seal means is further formed outside of both said second radial bearing pocket and said constant pressurized fluid chamber.

5. A machining spindle apparatus according to claim 1, further comprising:

a bearing fluid supply passage for delivering a bearing fluid to said first hydrostatic bearing means and said second hydrostatic bearing means;

an air supply passage for delivering pressurized air to said pneumatic seal means; and a collecting passage for collecting the bearing fluid to a reservoir, so that a pressure of the pressurized air assists in delivering the bearing fluid to the reservoir.

6. A machining spindle apparatus having a built-in motor built into a substantially middle part of a housing, comprising:

a machining spindle directly driven by the built-in motor;

a first hydrostatic bearing fixedly mounted on the housing and rotatably supporting one end of the machining spindle, said first hydrostatic bearing having a first radial bearing pocket for supporting radial loads;

a second hydrostatic bearing fixedly mounted on the housing and rotatably supporting the other end of the machining spindle, and said second hydrostatic bearing having a second radial bearing pocket; and a pneumatic seal sealing said first and second hydrostatic bearings, said pneumatic seal being formed outside of each of the respective radial bearing pockets.

7. A machining spindle apparatus according to claim 6, wherein:

said first hydrostatic bearing has a first thrust bearing pocket disposed on a cylindrical surface of the spindle, and said second hydrostatic bearing has a constant pressurized fluid chamber disposed on the opposite end of the machining spindle to said first thrust bearing pocket.

8. A machining spindle apparatus according to claim 7, wherein said pneumatic seal is formed outside of both said first radial bearing pocket and said first thrust bearing pocket.

9. A machining spindle apparatus according to claim 8, wherein said pneumatic seal is further formed outside of both said second radial bearing pocket and said constant pressurized fluid chamber.

10. A machining spindle apparatus according to claim 6, further comprising:

a bearing fluid supply passage for delivering a bearing fluid to said first hydrostatic bearing and said second hydrostatic bearing;

an air supply passage for delivering pressurized air to said pneumatic seal; and a collecting passage for collecting the bearing fluid to a reservoir, so that a pressure of the pressurized air assists in delivering the bearing fluid to the reservoir.

* * * * *